United States Patent [19]

Lee

[11] Patent Number: 5,714,849
[45] Date of Patent: Feb. 3, 1998

[54] CIRCUIT AND METHOD FOR ADJUSTING HORIZONTAL RETRACE TIME AND LIMITING PULSE PEAK IN DISPLAY DEVICE

[75] Inventor: Joo-Hyoung Lee, Suwon, Rep. of Korea

[73] Assignee: SamSung Electronics Co., Ltd., Suwon, Rep. of Korea

[21] Appl. No.: 785,972

[22] Filed: Jan. 22, 1997

[30] Foreign Application Priority Data

Jan. 22, 1996 [KR] Rep. of Korea .................... 1279/1996

[51] Int. Cl.⁶ .............................. H01J 29/70; H01J 29/76
[52] U.S. Cl. ................................. 315/408; 315/384
[58] Field of Search ........................... 315/408, 370, 315/371, 384

[56] References Cited

U.S. PATENT DOCUMENTS

| 4,687,972 | 8/1987 | Haferl | ........... | 315/371 |
| 4,705,993 | 11/1987 | Kashiwagi | | |
| 4,956,587 | 9/1990 | Kitou et al. | ........... | 315/408 |
| 5,043,637 | 8/1991 | Gries et al. | ........... | 315/371 |
| 5,399,945 | 3/1995 | Haferl | | |
| 5,510,845 | 4/1996 | Yang et al. | | |
| 5,528,112 | 6/1996 | George et al. | | |

*Primary Examiner*—Theodore M. Blum
*Attorney, Agent, or Firm*—Robert E. Bushnell, Esq

[57] ABSTRACT

A circuit for adjusting a horizontal retrace time and limiting a pulse peak in a display device includes a microcomputer for receiving a horizontal synchronous frequency and converting the horizontal synchronous frequency into a first voltage. A pulse generator compares the first voltage provided from the microcomputer with a triangular waveform to adjust a width of a retrace time adjusting pulse. A transformer receives an output voltage from the pulse generator to generate an induced voltage. A switching unit performs a switching operation in accordance with a magnitude of the induced voltage provided from the transformer. A clamping unit clamps the induced voltage provided from the transformer to limit a voltage peak value. A charging/discharging unit performs charging and discharging operations according to an output of the switching unit. A feedback unit rectifies, smoothes and divides the induced voltage at a secondary side of the transformer to generate a rectified, smoothed and divided voltage, and feeds the rectified, smoothed and divided voltage back to the pulse generator.

16 Claims, 4 Drawing Sheets

CIRCUIT AND METHOD FOR ADJUSTING HORIZONTAL RETRACE TIME AND LIMITING PULSE PEAK IN DISPLAY DEVICE

CROSS-REFERENCE TO RELATED APPLICATIONS

This application makes reference to, incorporates the same herein, and claims all benefits accruing under 35 U.S.C. §119 arising from an application for Circuit And Method For Adjusting Horizontal Retrace Time And Limiting Pulse Peak In Display Device earlier filed in the Korean Industrial Property Office on 22 Jan. 1996 and there duly assigned Ser. No. 1279/1996.

BACKGROUND OF THE INVENTION

The present invention relates to a circuit for a display device, and more particularly, to a circuit and method for adjusting a horizontal retrace time and limiting a pulse peak in a display device.

In general display devices, an electron gun within a cathode ray tube (CRT) scans a beam of light to display an image upon a screen. During this process, horizontal and vertical scanning operations are simultaneously executed. After horizontal scanning for a single line in a display area is completed, a scanning point is moved to execute scanning for a next line. The time during which the scanning point is moved is commonly referred to as a retrace time. A video signal is still generated during the retrace time. As a result, undesirable noise on the screen occurs due to the generation of the video signal during the retrace time. Therefore, to achieve a clear, quality video image, the video signal generated during the retrace time is erased and only a pure video signal is detected.

When the retrace time is reduced, a voltage peak value is relatively high, which is not satisfied with an output condition of a horizonal deflection transistor, under a predetermined retrace time. Moreover, there is provided a retrace line erasing circuit in a display device for erasing a retrace line signal generated when the horizontal scanning is moved to the next line. The retrace line erasing signal is commonly referred to a blanking signal. When the retrace time is reduced at a high horizontal frequency, a blanking time is increased at a relative low horizontal frequency. Accordingly, power consumption and a horizontal deflecting current are increased, so that overheating in a horizontal output transistor is generated due to the excessive amount of current. Therefore, there is a need to maintain the blanking time at a proper level.

Generally, the horizontal retrace time in a monitor is assigned to occupy approximately 17% to 20% of one horizontal period, and the blanking time in a video card is assigned to occupy approximately 20% to 25% of one horizontal period. However, in the case of a monitor having a high degree of resolution in which a horizontal frequency is extremely high, a horizontal retrace time percentage does not match with the above assigned percentage due to a characteristic limit of the horizontal output transistor.

On the other hand, in the case of a monitor in which the area using the horizontal frequency is large, the retrace time should be set in a use condition of a highest horizontal frequency. Accordingly, the deflection current, in a low frequency mode, should be increased to provide a real video size. As a result, the horizontal output transistor may be damaged. Efforts can be made to remedy this problem. With many of circuits attempting to remedy this problem, however, the reduction of retrace time is restricted due to a voltage peak value. In particular, I have noted that there is a limitation in that the adjustment of retrace time is achieved in accordance with an input frequency.

SUMMARY OF THE INVENTION

Accordingly, it is an object of the present invention to provide a circuit and process for adjusting a horizontal retrace time and limiting a pulse peak in a display device.

It is another object to provide a circuit for adjusting a horizontal retrace time and limiting a pulse peak which is capable of automatically adjusting a retrace time in correspondence with an input frequency in a multi-sink video display device, thereby restricting a voltage peak value.

To achieve these and other objects, the present invention provides a circuit for adjusting a horizontal retrace time and limiting a pulse peak in a display device. The circuit includes a microcomputer for receiving a horizontal synchronous frequency, and convening the horizontal synchronous frequency into a first voltage. A pulse generator compares the first voltage provided from the microcomputer with a triangular waveform to adjust a width of a retrace time adjusting pulse. A transformer receives an output voltage from the pulse generator to generate an induced voltage. A switching unit performs a switching operation in accordance with a magnitude of the induced voltage provided from the transformer. A clamping unit clamps the induced voltage provided from the transformer to limit a voltage peak value. A charging/discharging unit performs charging and discharging operations according to an output of the switching unit. A feedback unit rectifies, smoothes and divides the induced voltage at a secondary side of the transformer to generate a rectified, smoothed and divided voltage, and feeds the rectified, smoothed and divided voltage back to the pulse generator.

The present invention further provides a method for adjusting a horizontal retrace time and limiting a pulse peak in a display device by converting a horizontal synchronous frequency into a first voltage; comparing the first voltage with a triangular waveform to adjust a width of a retrace time adjusting pulse; generating an induced voltage in dependence upon the retrace time adjusting pulse; performing a switching operation in accordance with a magnitude of the induced voltage; clamping the induced voltage to limit a voltage peak value; performing charging and discharging operations in dependence upon a result of said switching operation; rectifying, smoothing and dividing the induced voltage to generate a rectified, smoothed and divided voltage; and providing the rectified, smoothed and divided voltage to a generating source of the retrace time adjusting pulse.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
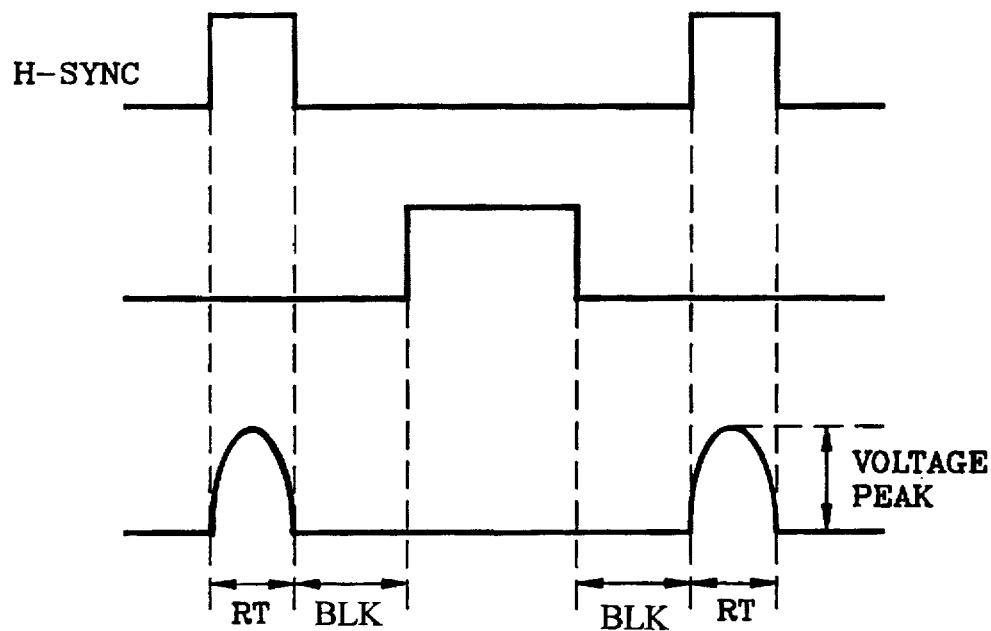
FIG. 1 is a waveform diagram showing a retrace time pulse and a blanking signal.

Turning now to the drawings and referring to FIG. 1, a waveform diagram of a retrace time pulse RT and a blanking signal BLK is shown. As indicated in FIG. 1, when the retrace time is reduced at a high horizontal frequency, a blanking time is increased at a relative low horizontal frequency. Accordingly, power consumption and a horizontal deflecting current are increased, so that overheating in a horizontal output transistor is generated due to the excessive amount of current. Therefore, there is a need to maintain the blanking time at a proper level.

Generally, the horizontal retrace time in a monitor is assigned to occupy approximately 17% to 20% of one horizontal period, and the blanking time in a video card is assigned to occupy approximately 20% to 25% of one horizontal period. However, in the case of a monitor having a high degree of resolution in which a horizontal frequency is extremely high, a horizontal retrace time percentage does not match with the above assigned percentage due to a characteristic limit of the horizontal output transistor.

On the other hand, in the case of a monitor in which the area using the horizontal frequency is large, the retrace time should be set in a use condition of a highest horizontal frequency. Accordingly, the deflection current, in a low frequency mode, should be increased to provide a real video size. As a result, the horizontal output transistor may be damaged.

Figure 2:
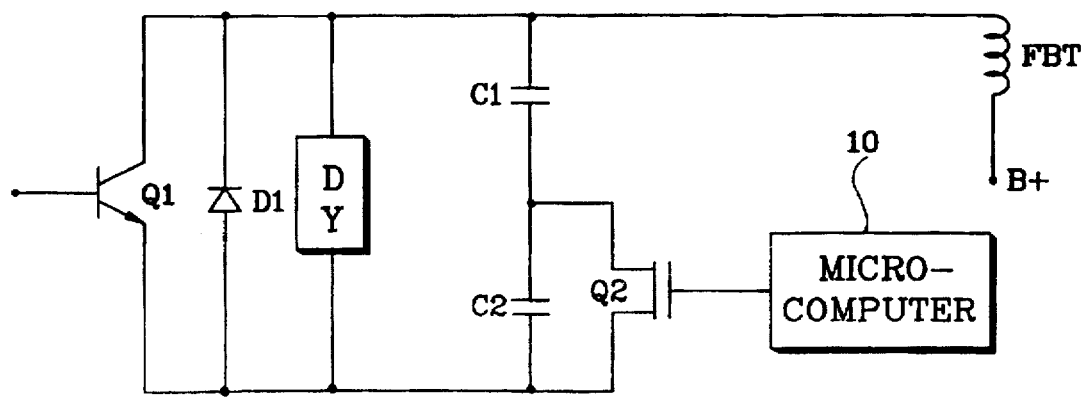
FIG. 2 is an abstract representation of a retrace time adjusting circuit.

Referring to FIG. 2, an abstract representation of a retrace time adjusting circuit is shown. In particular, the circuit of FIG. 2 is directed towards solving the above mentioned problems. The retrace time adjusting circuit of FIG. 2 includes a horizontal output transistor Q1 having a base terminal for receiving a horizontal driving signal, a damping diode D1 connected to an output terminal of the horizontal output transistor Q1, a deflection yoke DY, resonance capacitors C1 and C2 disposed between the deflection yoke DY and a flyback transformer FBT, a field effect transistor (FET) Q2 disposed at an intermediate contact point between the resonance capacitors C1 and C2, and a microcomputer 10 for switching the field effect transistor Q2.

In operation, the field effect transistor Q2 of FIG. 2 is turned on and off in accordance with an output signal of the microcomputer 10, and thus the values of the resonance capacitors C1 and C2 are changed to thereby adjust the retrace time. In the circuit of FIG. 2, however, it is noted that the reduction of retrace time is restricted due to a voltage peak value. Namely, there is a limitation in that the adjustment of retrace time is achieved in accordance with an input frequency.

The preferred embodiments of the present invention will now be described in detail with reference to the accompanying drawings.

Figure 3:
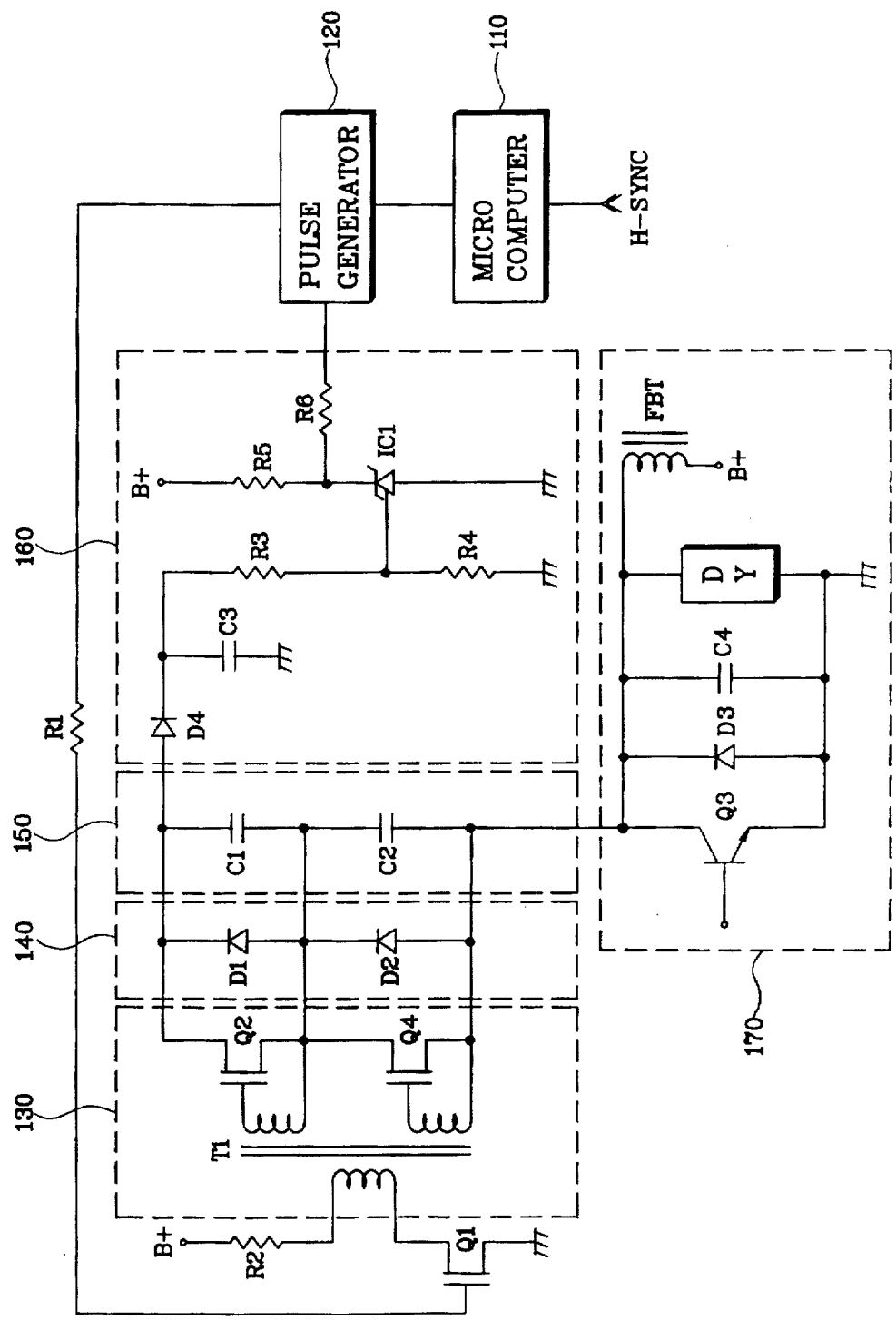
FIG. 3 is a circuit for adjusting a retrace time and limiting a pulse peak according to the principles of the present invention.

Referring now to FIG. 3, a circuit for adjusting a retrace time and limiting a pulse peak according to the principles of the present invention is shown. The circuit of FIG. 3 includes a microcomputer 110 for converting a horizontal synchronous frequency H-SYNC into a voltage by a digital-to-analog converter installed within the interior of the device. A pulse generator 120 compares the voltage output from microcomputer 110 with a triangular waveform to thereby adjust a width of a retrace time adjusting pulse. A transformer T1 is connected to the pulse generator 120, and receives an output voltage from the pulse generator 120 to thereby generate an induced voltage. A switching unit 130 is disposed at a secondary side of the transformer T1, and is switched in accordance with a magnitude of the induced voltage provided from transformer T1. A clamping unit 140 clamps the induced voltage provided from transformer T1 to thereby limit a voltage peak value. A charging/discharging unit 150 performs charging and discharging operations according to an output of the switching unit 130. A feedback unit 160 rectifies, smoothes and voltage-divides the induced voltage at the secondary side of the transformer T1, and feeds the rectified, smoothed and divided voltage back to the pulse generator 120. A horizontal output unit 170 is connected to contact points of the switching unit 130, the clamping unit 140 and the charging/discharging unit 150.

A detecting resistor R1 and a field effect transistor Q1 are disposed between the pulse generator 120 and a primary side coil of the transformer T1. The primary side coil of the transformer T1 is disposed between the field effect transistor Q1 and a resistor R2. Detecting resistor R1 detects the output signal from pulse generator 120, and the field effect transistor Q1 is turned on and off according to a voltage applied from the detecting resistor R1. Switching unit 130 is comprised of field effect transistors Q2 and Q4, clamping unit 140 is comprised of diodes D1 and D2, and charging/discharging unit 150 is comprised of charging/discharging capacitors C1 and C2.

Feedback unit 160 includes a rectifying diode D4 for rectifying the induced voltage at the secondary side coil of the transformer T1, a smoothing capacitor C3, voltage-dividing resistors R3 and R4, a constant-voltage integrated circuit IC1 to which a voltage on an intermediate contact point of the voltage-dividing resistors R3 and R4 is applied as a reference voltage, and resistors R5 and R6 for dividing a voltage through the constant-voltage integrated circuit IC1 to thereby transmit the divided voltage to pulse generator 120.

Horizontal output unit 170, which is connected to contact points of switching unit 130, clamping unit 140 and charging/discharging unit 150, includes a transistor Q3, a diode D3, a capacitor C4, a deflection yoke DY and a flyback transformer FBT. The base terminal of transistor Q3 receives a horizontal driving signal.

In operation, microcomputer 110 receives the horizontal synchronous signal H-SYNC from a computer and discriminates the received signal. Microcomputer 110 then converts the signal into a voltage according to an input frequency using the digital-to-analog converter installed within the interior of the device. Pulse generator 120 compares the voltage output from microcomputer 110 with a triangular waveform, and adjusts a width of a retrace time adjusting pulse to output the adjusted pulse.

Figure 4A:
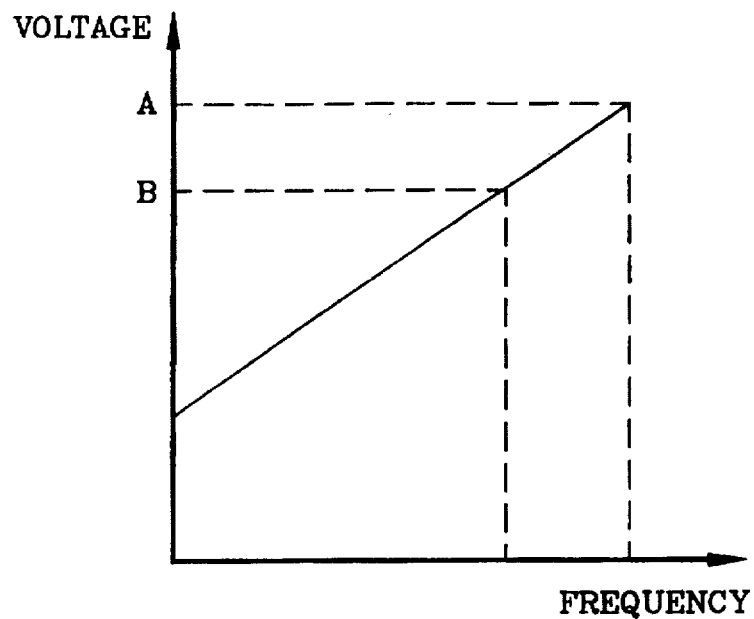
FIG. 4A is a graph showing the relationship between the voltage and frequency of an output signal of the microcomputer 110 of FIG. 3.
Figure 4B:
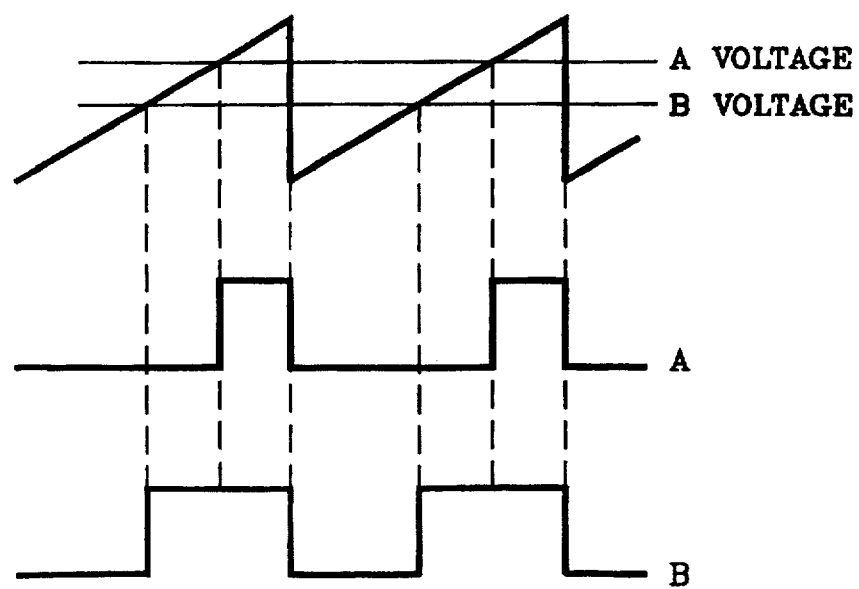
FIG. 4B shows waveform diagrams of exemplary output signals from the pulse generator shown in FIG. 3.

FIG. 4A is a graph showing the relationship between the voltage and frequency of an output signal of the microcomputer 110 of FIG. 3, and FIG. 4B shows waveform diagrams of exemplary output signals of the pulse generator 120 of FIG. 3. FIG. 4B also shows the triangular waveform that the pulse generator 120 compares with the output voltage of microcomputer 110. As shown in FIG. 4B, when the voltage output from microcomputer 110 is high (i.e., A voltage), the width of pulse output from pulse generator 120 is relatively small. On the other hand, when the voltage output from microcomputer 110 is low (i.e., B voltage), the width of pulse output from pulse generator 120 is relatively large.

The output voltage of pulse generator 120 is applied, via detecting resistor R1, to the gate terminal of the field effect transistor Q1, which is connected to the primary side coil of the transformer T1. The induced voltage at the secondary side coil of the transformer T1 is then applied to the field effect transistors Q2 and Q4 of the switching unit 130. As a result, the field effect transistors Q2 and Q4 are turned on to thereby discharge the charging/discharging capacitors C1 and C2. In this case, the signal generated at the secondary side of the transformer T1 has a phase difference of about 180° from the output signal of the pulse generator 120.

Figure 5A:
FIG. 5A is a waveform diagram of a retrace time adjusting pulse of FIG. 3.
Figure 5B:
FIG. 5B is a waveform diagram of a retrace time pulse of FIG. 3.

FIG. 5A is a waveform of the retrace time adjusting pulse appearing at the secondary side of the transformer T1, and FIG. 5B is a waveform of the retrace time pulse appearing at a contact point of the charging/discharging capacitors C1 and C2 with a collector terminal of the horizontal output transistor Q3.

As shown in FIGS. 5A and 5B, the retrace time adjusting pulse is variable in accordance with the magnitude of input frequency, and accordingly, the retrace time pulse is changed. Namely, the pulse generator 120 transforms the voltage in dependence upon the input frequency received from the microcomputer 110 to generate the retrace time adjusting pulse with an adjusted pulse width. The retrace time adjusting pulse has a relatively small width when the input frequency is high, and has a relatively large width when the input frequency is low. Sequentially, the width of the retrace time pulse is adjusted according to the variation of the retrace time adjusting pulse width. A voltage peak of the retrace time pulse is restricted by the clamping diodes D1 and D2 of the clamping unit 140 connected to the secondary side of the transformer T1.

The pulse applied to the drain terminal of the field effect transistor Q2, which is connected to the secondary side of the transformer T1, is rectified by the rectifying diode D4, smoothed by the smoothing capacitor C3, then voltage-divided by the voltage-dividing resistors R3 and R4. The divided voltage is applied to the constant-voltage integrated circuit IC1 as a reference voltage, and the resistors R5 and R6 divide the output voltage through the constant-voltage integrated circuit IC1 to thereby transmit the divided voltage to the pulse generator 120. The fed back voltage is used to compensate for the adjustment of the horizontal size.

Figure 6:
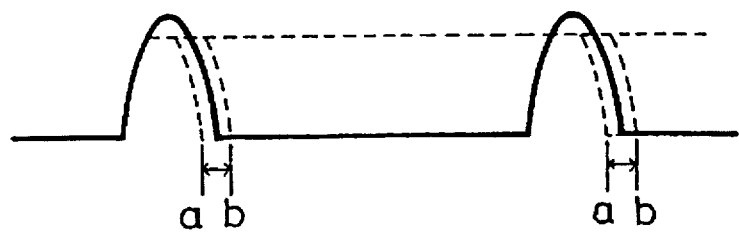
FIG. 6 is a waveform diagram showing a variation of a retrace time pulse of FIG. 3.

FIG. 6 is a waveform diagram showing a variation of a retrace time pulse of FIG. 3. The size of width of the retrace time pulse is determined by the discharge time of the charging/discharging capacitors C1 and C2. If the discharge time is short, the size of width, as shown by signal "a", is relatively small. On the other hand, if the discharge time is long, the size of width, as shown by signal "b", is relatively large.

The voltage peak value is determined by the clamping diodes D1 and D2. The switching time of the charging/discharging capacitors C1 and C2 is adjusted by the retrace time adjusting pulse which is adjusted in accordance with the input frequency.

As discussed above, the circuit for adjusting a retrace time and limiting a pulse peak according to the present invention can automatically adjust a retrace time in correspondence with an input frequency in a multi-sink video display device, and thereby restrict a voltage peak value. In addition, the circuit of the present invention can prevent unnecessary power consumption and excessice current of the horizontal output transistor caused when a blanking time is increased at a relative low horizontal frequency.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for adjusting a horizontal retrace time and limiting a pulse peak in a display device, said circuit comprising:

a microcomputer for receiving a horizontal synchronous frequency, and converting the horizontal synchronous frequency into a first voltage;

a pulse generator for comparing the first voltage provided from said microcomputer with a triangular waveform to adjust a width of a retrace time adjusting pulse;

a transformer for receiving an output voltage from said pulse generator to generate an induced voltage;

a switching unit for performing a switching operation in accordance with a magnitude of the induced voltage provided from said transformer;

a clamping unit for clamping the induced voltage provided from said transformer to limit a voltage peak value;

a charging/discharging unit for performing charging and discharging operations according to an output of said switching unit; and a feedback unit for rectifying, smoothing and voltage-dividing the induced voltage at a secondary side of said transformer to generate a rectified, smoothed and divided voltage, and feeding the rectified, smoothed and divided voltage back to said pulse generator.

2. The circuit as claimed in claim 1, wherein said microcomputer converts the horizontal synchronous frequency into the first voltage via a digital-to-analog conversion process.

3. The circuit as claimed in claim 1, further comprising a horizontal output unit connected to contact points of said switching unit, said clamping unit and said charging/discharging unit.

4. The circuit as claimed in claim 1, further comprising a detecting resistor and a field effect transistor disposed between said pulse generator and a primary side of said transformer.

5. The circuit as claimed in claim 1, wherein said switching unit comprises first and second field effect transistors.

6. The circuit as claimed in claim 1, wherein said clamping unit comprises first and second diodes.

7. The circuit as claimed in claim 1, wherein said feedback unit comprises a diode for rectifying the induced voltage to generate a rectified voltage.

8. The circuit as claimed in claim 7, wherein said feedback unit further comprises a capacitor for smoothing the rectified voltage to generate a smoothed, rectified voltage.

9. The circuit as claimed in claim 8, wherein said feedback unit further comprises a plurality of resistors for dividing the smoothed, rectified voltage to generate the smoothed, rectified and divided voltage.

10. A method for adjusting a horizontal retrace time and limiting a pulse peak in a display device, said method comprising the steps of:

converting a horizontal synchronous frequency into a first voltage;

comparing the first voltage with a triangular waveform to adjust a width of a retrace time adjusting pulse;

generating an induced voltage in dependence upon the retrace time adjusting pulse;

performing a switching operation in accordance with a magnitude of the induced voltage;

clamping the induced voltage to limit a voltage peak value;

performing charging and discharging operations in dependence upon a result of said switching operation;

rectifying, smoothing and dividing the induced voltage to generate a rectified, smoothed and divided voltage; and providing the rectified, smoothed and divided voltage to a generating source of the retrace time adjusting pulse.

11. The method as claimed in claim 10, wherein the horizontal synchronous frequency is converted into the first voltage via a digital-to-analog conversion process.

12. A circuit for adjusting a horizontal retrace time and limiting a pulse peak in a display device, said circuit comprising:

a microcomputer for receiving a horizontal synchronous frequency, and converting the horizontal synchronous frequency into a first voltage;

a pulse generator for comparing the first voltage provided from said microcomputer with a triangular waveform to adjust a width of a retrace time adjusting pulse;

a transformer for receiving an output voltage from said pulse generator to generate an induced voltage; and a feedback unit for rectifying, smoothing and voltage-dividing the induced voltage at a secondary side of said transformer to generate a rectified, smoothed and divided voltage, and feeding the rectified, smoothed and divided voltage back to said pulse generator.

13. The circuit as claimed in claim 12, wherein said microcomputer converts the horizontal synchronous frequency into the first voltage via a digital-to-analog conversion process.

14. The circuit as claimed in claim 12, wherein said feedback unit comprises a diode for rectifying the induced voltage to generate a rectified voltage.

15. The circuit as claimed in claim 14, wherein said feedback unit further comprises a capacitor for smoothing the rectified voltage to generate a smoothed, rectified voltage.

16. The circuit as claimed in claim 15, wherein said feedback unit further comprises a plurality of resistors for dividing the smoothed, rectified voltage to generate the smoothed, rectified and divided voltage.

\* \* \* \* \*